June 3, 1952 J. C. MEILING 2,599,120
WHEEL ASSEMBLY
Filed June 21, 1948 2 SHEETS—SHEET 1

Inventor
John C. Meiling
By Clarence A. O'Brien
and Harvey B. Jacobson
Attorneys June 3, 1952    J. C. MEILING    2,599,120
WHEEL ASSEMBLY Filed June 21, 1948    2 SHEETS—SHEET 2

Inventor
John C. Meiling

By Clarence A. O'Brien
and Harvey B. Jacobson
Attorneys

Patented June 3, 1952

2,599,120

UNITED STATES PATENT OFFICE 2,599,120

WHEEL ASSEMBLY

John C. Meiling, Provo, Utah

Application June 21, 1948, Serial No. 34,295

7 Claims. (Cl. 301—9)

This invention relates to new and useful improvements in wheel assemblies and the primary object of the present invention is to provide a wheel construction including a brake drum, a tire supporting disk, a wheel hub cap, and novel and improved means for removably securing the brake drum, disk and hub cap to each other in an assembled position for use.

Another important object of the present invention is to provide a wheel assembly, the parts of which are quickly and readily assembled or disassembled facilitating the replacement of inoperative wheel disks or wheel disks having flat tires in a more convenient manner than was heretofore possible.

A further object of the present invention is to provide a wheel assembly including a wheel disk, a hub removably secured to the wheel disk by a bolt, and novel and improved means for normally holding the bolt against rotation which is released from a locked position as a tool is applied to the bolt.

A still further aim of the present invention is to provide a wheel assembly that is simple and practical in construction, strong and reliable in use, small and compact in structure, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
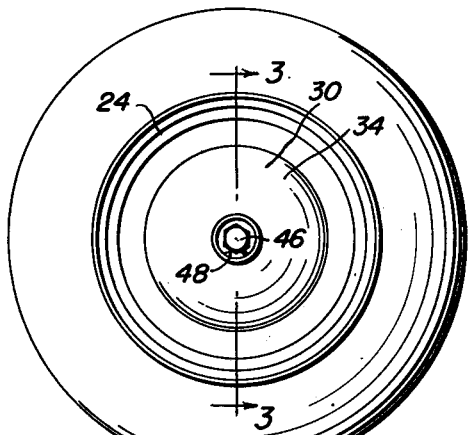
Figure 1 is a side elevational view of the wheel assembly constructed in accordance with the present invention.
Figure 2:
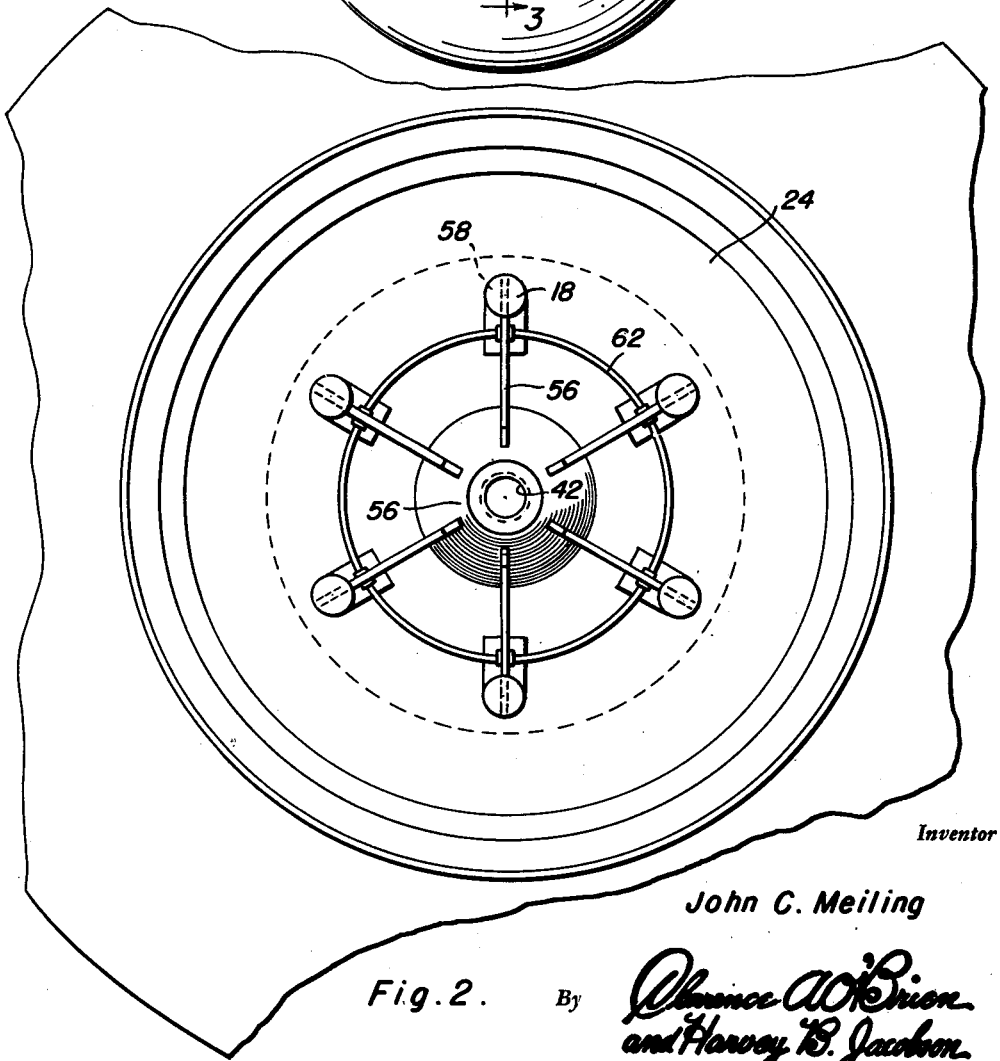
Figure 2 is a side elevational view of the present invention, the hub caps removed therefrom and the holding members in position to the lugs.
Figures 3, 4, 5:
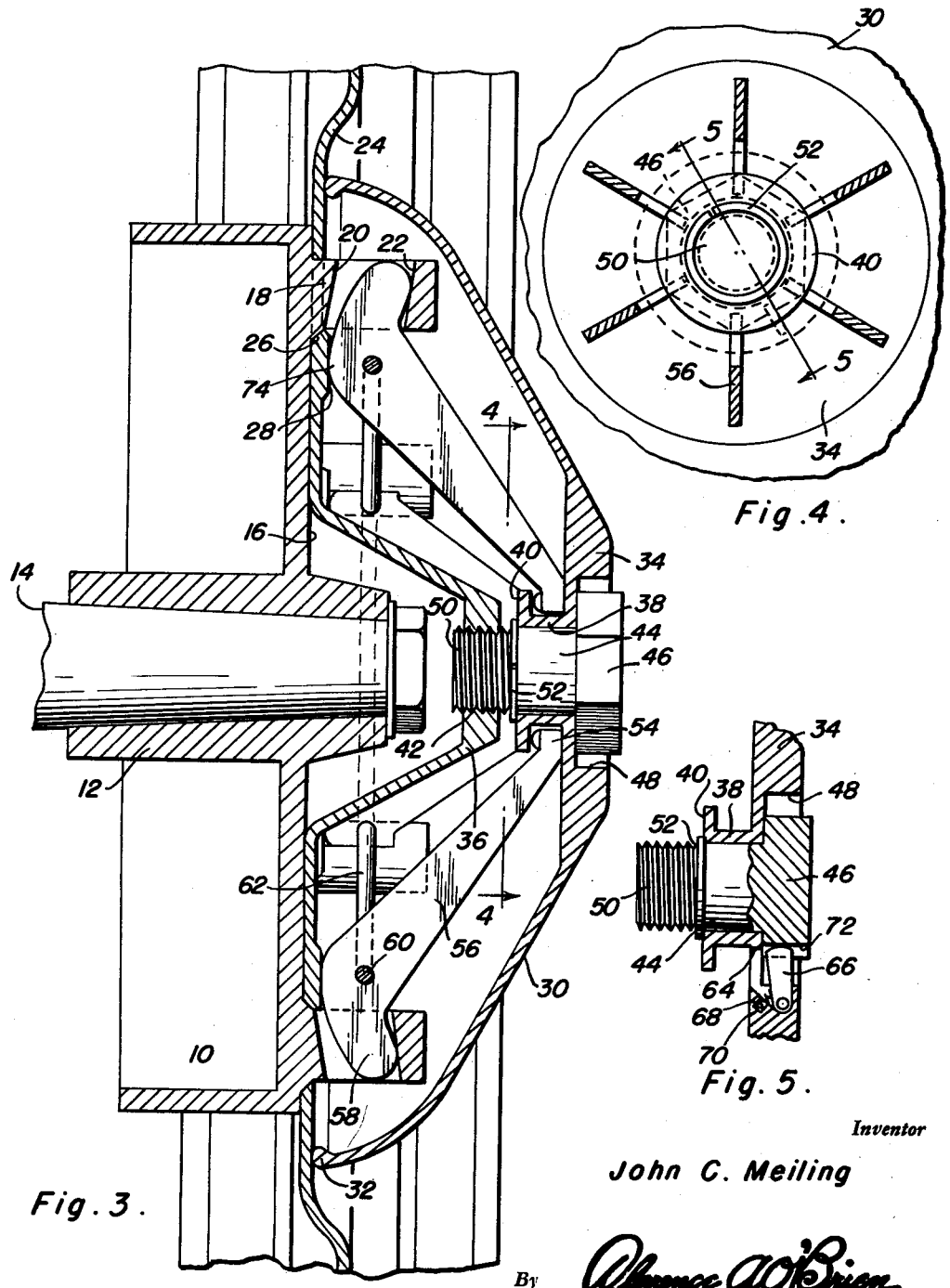
Figure 3 is an enlarged fragmentary sectional view taken substantially on the plane of section line 3—3 of Figure 1.
Figure 4 is a sectional view taken substantially on the plane of section line 4—4 of Figure 3.
Figure 5 is a sectional view taken substantially on the plane of section line 5—5 of Figure 4.

Referring now to the drawings in detail, wherein for the purpose of illustration, there is disclosed a preferred embodiment of the present invention, the numeral 10 represents an annular brake drum, the central portion of which is integrally formed with a bearing element 12 for a wheel axle 14.

Integrally formed with the outer surface 16 of the brake drum 10 is a plurality of circumferentially spaced, outwardly projecting lugs 18 that are formed with openings 20 having bearing faces 22.

The numeral 24 represents a wheel disk that is provided with a plurality of circumferentially spaced openings 26 that receive the lugs 18. The outer face of the disk 24 is provided with raised bearing portions 28 that are disposed adjacent the openings 26 in wheel disk 24 when the lugs 18 are extended through the openings 26 in the wheel disk 24.

A concavo-convexed hub cap 30 is provided with an annular bead portion 32 that bears against the outer face of the wheel disk 24. This hub cap 30 includes a central portion 34 that is spaced relative to the outwardly projecting central portion 36 of the wheel disk 24.

Integrally formed with the central portion 34 of the hub cap 30 is an inwardly directed bearing sleeve 38 that is formed with an annular flanged portion 40. This bearing sleeve 38 aligns and registers an internally threaded opening 42 provided in the central portion 36 of the wheel disk 24.

Rotatably supported in the sleeve 38 and an opening in the central portion 36 of the wheel disk 24 is a bolt 44 having a multi-sided head portion 46 that is loosely positioned in a recess or socket 48 provided in the outer surface of the portion 36. The inner end 50 of the bolt 44 is externally threaded to receivably engage the opening 42 in the central portion 36 of the wheel disk 24, and there is disposed a split ring 52 on the bolt 44 against the flanged portion 40 of the sleeve 38.

Interposed between the inner face of the central portion 34 of the hub cap 30 and the flanged portion 40 are the reduced and angulated end portions 54 of a plurality of holding members or levers 56 having enlarged and outwardly turned end portions 58 which are formed with apertures 60 that slidably engage a steel band or resilient ring 62. This steel band 62 connects and retains the holding members relative to each other and will permit movement of the end portions 58 with respect to each other.

Pivoted in an opening 64 provided in the central portion 34 of the hub 30 communicating with the socket 48 is a locking latch 66 that is urged by a coil spring 68 recessed in a spring seat 70 into a slot 72 provided in the head portion 46 of the bolt 44 to normally lock and hold the bolt against rotation. As a socket wrench or such a tool is inserted in the socket 48 to engage the head 46 of the bolt 44, the latch 66 is forced out of engagement with the slot 72 and the bolt is free for rotation.

In practical use of the present invention, as the bolt 44 is rotated so that the end 50 thereof receivably engages the aperture 42, the hub 30 is forced toward the wheel disk 24 and the arcuated bearing edges 74 of the holding members 56 engage and bear against the bearing portions 28 of the disk 24. Upon continued turning of the bolt 44, pressure is applied on the central portion 34 of the hub cap 30 and in turn considerable leverage is applied to the holding members that engage the openings in the lugs 18 so that the ends 58 of the holding members will bear against the bearing faces 22 of the openings 20.

Although there is shown in the drawings a disk 24 of a particular type, it is noted that the same is a conventional construction and that the same is employed only as a means of description since the present invention is applicable for rims of various designs.

Obviously, the present wheel assembly is designed for use with any type of axle or an axle which is held stationary to a wheel or one that rotates with the wheel.

In view of the foregoing description, taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A wheel assembly comprising a brake drum, a plurality of lugs fixed to said brake drum and projecting outwardly therefrom, a wheel disk having a plurality of openings receiving the lugs, said wheel disk having a central, outwardly projecting portion, a hub cap engaging the wheel disk and including a central portion spaced relative to the central portion of the wheel disk, means securing the central portion of the hub cap to the central portion of the wheel disk, and means carried by the hub cap for lockably engaging the lugs.

2. The combination of claim 1 wherein said lugs are provided with openings and said last mentioned means includes a plurality of holding arms carried by said hub cap and having end portions received in the openings in the lugs.

3. A wheel assembly comprising a brake drum, a plurality of lugs fixed to said brake drum and projecting outwardly therefrom, a wheel disk having a plurality of openings receiving the lugs, said wheel disk having a central, outwardly projecting portion, a hub cap engaging the wheel disk and including a central portion spaced relative to the central portion of the wheel disk, a bolt rotatably carried by the central portion of said hub cap and receivably engaging the central portion of said wheel disk, means for locking the bolt against rotation, and means carried by the hub cap lockably engaging the lugs.

4. The combination of claim 3 wherein said bolt includes a head portion having a slot therein, and said means for locking the bolt against rotation includes a pivotal latch carried by the hub cap, and means normally urging the latch into the slot provided in the head portion of said bolt.

5. The combination of claim 4 wherein said latch urging means includes a spring compressible by the engagement of a tool with the head portion of the bolt.

6. A wheel assembly comprising a brake drum, a plurality of circumferentially spaced outwardly projecting lugs rigidly secured to the brake drum and having openings therein, a wheel disk having a plurality of circumferentially spaced openings receiving the lugs, a substantially concavo-convexed hub cap having a central portion spaced relative to the wheel rim, said hub cap including a bearing portion abutting the wheel disk, a headed bolt rotatably carried by the hub cap and having a threaded end portion, said wheel disk having a central internally threaded aperture receivably engaging the threaded end portion of the bolt, means normally locking the bolt against rotation, a plurality of circumferentially spaced holding arms carried by said hub cap, said holding arms having angulated end portions engaging the openings in the lugs, and means connecting the holding arms to each other.

7. The combination of claim 6 wherein said last mentioned means includes a resilient band.

JOHN C. MEILING.

REFERENCES CITED

The following references are of record in the file of this patent:

UNITED STATES PATENTS

| Number | Name | Date |
|---|---|---|
| 1,766,375 | Crain | June 24, 1930 |
| 2,029,866 | Haberl | Feb. 4, 1936 |

FOREIGN PATENTS

| Number | Country | Date |
|---|---|---|
| 500,355 | Great Britain | Feb. 7, 1939 |
| 738,341 | France | Dec. 23, 1932 |